(12) United States Patent
Somers

(10) Patent No.: US 10,297,274 B2
(45) Date of Patent: May 21, 2019

(54) SHINGLED MAGNETIC RECORDING RAID SCHEME

(71) Applicant: Alan William Somers, Longmont, CO (US)

(72) Inventor: Alan William Somers, Longmont, CO (US)

(73) Assignee: Spectra Logic, Corp., Boulder, CO (US)

( * ) Notice: Subject to any disclaimer, the term of this patent is extended or adjusted under 35 U.S.C. 154(b) by 28 days.

(21) Appl. No.: 15/610,108

(22) Filed: May 31, 2017

(65) Prior Publication Data

US 2017/0352375 A1    Dec. 7, 2017

Related U.S. Application Data

(60) Provisional application No. 62/343,925, filed on Jun. 1, 2016.

(51) Int. Cl.
*G11B 20/12* (2006.01)
*G11B 5/008* (2006.01)
(Continued)

(52) U.S. Cl.
CPC ......... *G11B 5/00813* (2013.01); *G11B 15/18* (2013.01); *G11B 20/1217* (2013.01);
(Continued)

(58) Field of Classification Search
CPC ...... G11B 2020/1222; G11B 2020/415; G06F 11/1076
See application file for complete search history.

(56) References Cited

U.S. PATENT DOCUMENTS

| 5,706,298 | A  | * | 1/1998 | Sandorfi | G06F 11/10 714/807 |
| 6,591,339 | B1 | * | 7/2003 | Horst    | G06F 3/061 711/114 |

(Continued)

OTHER PUBLICATIONS

Shingled Magnetic Recording Disk, Carnegie Mellon University. (Year: 2011).*

*Primary Examiner* — Midys Rojas
*Assistant Examiner* — Khoa D Doan
(74) *Attorney, Agent, or Firm* — Kenneth Altshuler

(57) ABSTRACT

A method for recording parity data of data stripes within shingled media recording bands in a redundant array of independent disks can be accomplished using a plurality of shingled media recording (SMR) hard disk drives (HDD) each with a plurality of shingled data bands. A data stream received from a host computer system is sequentially stored to a plurality of block segments in successive order, one stripe at a time successively. Each of the shingled data bands possess n data blocks (or multiple data blocks that are grouped together as a data unit) that are successively ordered, each corresponding successive data block from all of the SMR HDDs defines a data stripe, accordingly n data blocks in each SMR HDD defines n stripes across the shingled data bands. A transaction group sync triggers a halt to writing the data stream. The rest of the data stripe is written with fill bits. Parity data is written to a parity drive in one or more SMR parity blocks that correspond in size and sequence to the data blocks in the data stripes possessing the first data stream and any of the fill bits.

19 Claims, 12 Drawing Sheets

(51) Int. Cl.
*G11B 15/18* (2006.01)
*G11B 20/18* (2006.01)

(52) U.S. Cl.
CPC .. *G11B 20/1833* (2013.01); *G11B 2020/1238* (2013.01); *G11B 2220/41* (2013.01); *G11B 2220/415* (2013.01)

(56) References Cited

U.S. PATENT DOCUMENTS

| | | | | |
|---|---|---|---|---|
| 6,681,304 | B1* | 1/2004 | Vogt | G06F 12/1466 |
| | | | | 711/100 |
| 8,699,162 | B1* | 4/2014 | Grobis | G11B 5/09 |
| | | | | 360/45 |
| 9,189,332 | B1* | 11/2015 | Moon | G06F 11/1044 |
| 9,431,061 | B1* | 8/2016 | Slik | G11B 27/36 |
| 9,437,232 | B1* | 9/2016 | Galbraith | G11B 5/59627 |
| 9,454,990 | B1* | 9/2016 | Fukuhisa | G11B 20/1217 |
| 9,530,442 | B1* | 12/2016 | Hassner | G06F 11/0727 |
| 9,836,369 | B2* | 12/2017 | MacKo | G11B 20/10527 |
| 2002/0048284 | A1* | 4/2002 | Moulton | G06F 11/1076 |
| | | | | 370/500 |
| 2002/0188796 | A1* | 12/2002 | Suzuki | G06F 12/1458 |
| | | | | 711/103 |
| 2004/0160975 | A1* | 8/2004 | Frank | G06F 11/1076 |
| | | | | 370/432 |
| 2005/0131990 | A1* | 6/2005 | Jewell | G06F 11/1464 |
| | | | | 709/201 |
| 2005/0160309 | A1* | 7/2005 | Golding | G06F 3/0608 |
| | | | | 714/6.22 |
| 2005/0168934 | A1* | 8/2005 | Wendel | G11B 33/08 |
| | | | | 361/679.36 |
| 2006/0039108 | A1* | 2/2006 | Chikusa | G06F 1/20 |
| | | | | 361/695 |
| 2007/0168682 | A1* | 7/2007 | Nishimiya | G06F 1/3203 |
| | | | | 713/300 |
| 2008/0109616 | A1* | 5/2008 | Taylor | G06F 3/0611 |
| | | | | 711/155 |
| 2012/0131263 | A1* | 5/2012 | Yeh | G06F 12/0246 |
| | | | | 711/103 |
| 2013/0148225 | A1* | 6/2013 | Coker | G11B 19/045 |
| | | | | 360/31 |
| 2013/0246703 | A1* | 9/2013 | Bandic | G11B 5/012 |
| | | | | 711/113 |
| 2014/0019680 | A1* | 1/2014 | Jin | G11B 5/012 |
| | | | | 711/112 |
| 2014/0254042 | A1* | 9/2014 | Yeo | G11B 20/1217 |
| | | | | 360/48 |
| 2015/0113224 | A1* | 4/2015 | Achilles | G06F 12/0891 |
| | | | | 711/135 |
| 2015/0135005 | A1* | 5/2015 | Hsu-Hung | G06F 11/1096 |
| | | | | 714/6.24 |
| 2015/0205667 | A1* | 7/2015 | Bonwick | G06F 11/1076 |
| | | | | 714/6.24 |
| 2015/0220397 | A1* | 8/2015 | Uchiyama | G06F 11/1096 |
| | | | | 714/6.24 |
| 2015/0339066 | A1* | 11/2015 | Kowles | G06F 3/0619 |
| | | | | 711/103 |
| 2016/0321174 | A1* | 11/2016 | Li | G06F 12/0866 |
| 2016/0364157 | A1* | 12/2016 | Hess | G06F 3/061 |
| 2017/0123944 | A1* | 5/2017 | Macko | G11B 20/10527 |
| 2018/0239671 | A1* | 8/2018 | Wei | G06F 12/00 |

* cited by examiner

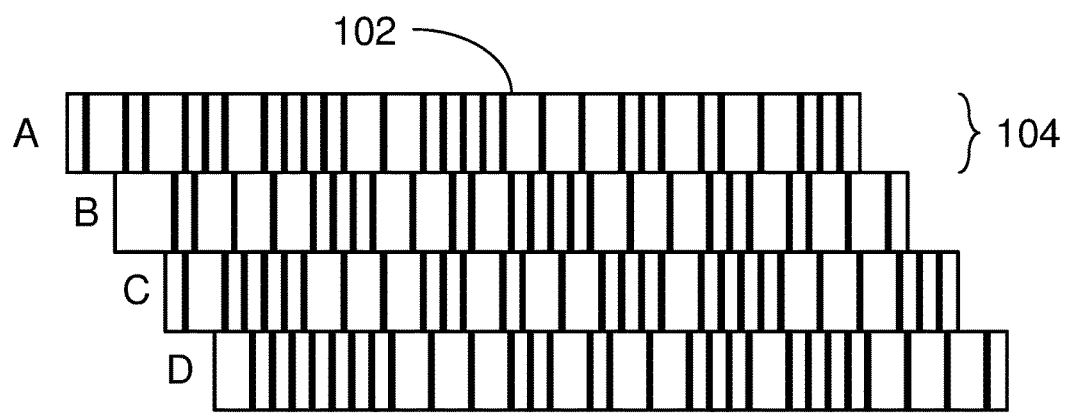
FIG. 1A *PRIOR ART*
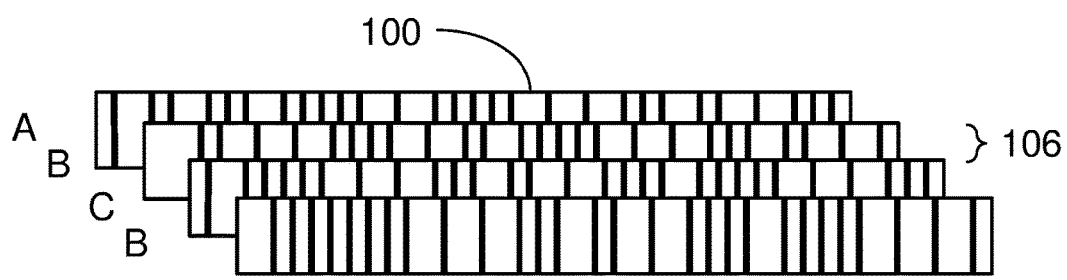
FIG. 1B *PRIOR ART*

SHINGLED MAGNETIC RECORDING RAID SCHEME

CROSS-REFERENCE TO RELATED APPLICATIONS

This application is a non-provisional application which claims priority to and the benefit of U.S. Provisional Patent Application Ser. No. 62/343,925, entitled SHINGLED MAGNETIC RECORDING RAID SCHEME filed Jun. 1, 2016, the entire disclosure of which is hereby incorporated by reference.

BACKGROUND OF THE INVENTION

1. Field of the Invention

The present invention relates generally to recording parity data of data stripes within shingled media recording bands in a redundant array of independent disks.

2. Description of Related Art

Shingle Magnetic Recording, SMR, is a technique used in disk drives to increase areal density significantly. FIGS. 1A and 1B depict the track layout of SMR writes. A traditional track layout 102 depicted in FIG. 1A possesses track widths 104 defined by the width of a write element. Because a read element is narrower than the write element, write tracks can be overlapped (in a shingled-like arrangement) to the read width 106 of a read element. FIG. 1B depicts a single magnetic recording (SMR) layout 100. As shown, tracks 'A', 'B', 'C', and 'D' in FIG. 1A are overlapped in a shingled arrangement in FIG. 1B.

It is generally to this subject matter that embodiments of the present invention are directed.

SUMMARY OF THE INVENTION

The present invention relates generally to recording parity data of data stripes within shingled media recording bands in a redundant array of independent disks.

Embodiments of the present invention contemplate a method that includes providing at least a plurality of shingled media (SMR) hard disk drives (HDD), at least one of the SMR HDDs designated as a parity drive. Each of the SMR HDDs possessing at least a first shingled band, which in turn each (shingle bands) possessing an equivalent number of block segments. A first of the block segments in each of the shingled bands defines a first block segment stripe, and each successive corresponding block segment in each of the shingled bands defines a successive block segment stripe. The method progresses by receiving a first data stream from a host system; sequentially storing the first data stream successively to the first block segments except the at least one parity drive until receiving a transaction group sync from the host system; padding any remaining portion of the first block segment stripe except the at least one parity drive with padded digital data until first block segment stripe is completely full of the first data stream and the padded digital data, such as zeros. Parity of the first data stream can be stored to the first block of the at least one parity drive. The parity includes the first data stream of the stripe and the first padded digital data stored.

Other embodiments contemplate a method comprising providing a plurality of shingled media recording (SMR) hard disk drives (HDD) each with a shingled data band, each of the shingled data bands possessing n data blocks that are successively ordered, each corresponding successive data block from all of the plurality of SMR HDDs defines a data stripe, the n data blocks in each SMR HDD defines n stripes across the shingled data bands; receiving a first data stream from a host system; sequentially storing the first data stream to a plurality of the block segments in the successive order, one of the stripes at a time successively; receiving a first transaction group sync while writing at least a portion of the first data stream to a specific data stripe; writing fill bits to any remaining data blocks or portions of the data blocks in the specific data stripe not already written with data from the first data stream; and writing parity data to at least one parity drive in SMR parity blocks that correspond in size and sequence to the data blocks in the data stripes possessing the first data stream and any of the fill bits.

Yet other embodiments of the present invention contemplate a method comprising: providing at least a first, a second, a third, and a parity shingled media recording (SMR) hard disk drive (HDD) each with a shingled data band, each of the shingled data bands possessing a specified number of data blocks arranged in order successively, all of the data blocks from the SMR HDDs that correspond in a specific position in the order define a data stripe, there is an identical number of the data stripes and the specified number of data blocks; receiving a first data stream from a host system; sequentially storing the first data stream to a plurality of the block segments in the successive order, one of the stripes at a time successively; receiving a first transaction group sync while writing at least a portion of the first data stream to a specific data stripe; writing fill bits to any remaining data blocks or portions of the data blocks in the specific data stripe not already written with data from the first data stream; and writing parity data to at least one parity drive in SMR parity blocks that correspond in size and sequence to the data blocks in the data stripes possessing the first data stream and any of the fill bits.

BRIEF DESCRIPTION OF THE DRAWINGS

The invention will be described with reference to the accompanying drawings, wherein:

FIG. 1A depicts a traditional track layout of hard disk drives known in the prior art;

FIG. 1B depicts a shingled magnetic recording arrangement known in the prior art;

DESCRIPTION OF PREFERRED EMBODIMENTS

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of parity to protect against data loss in SMR or SMR-like data layouts. In what follows, similar or identical structures may be identified using identical callouts.

Figure 2:
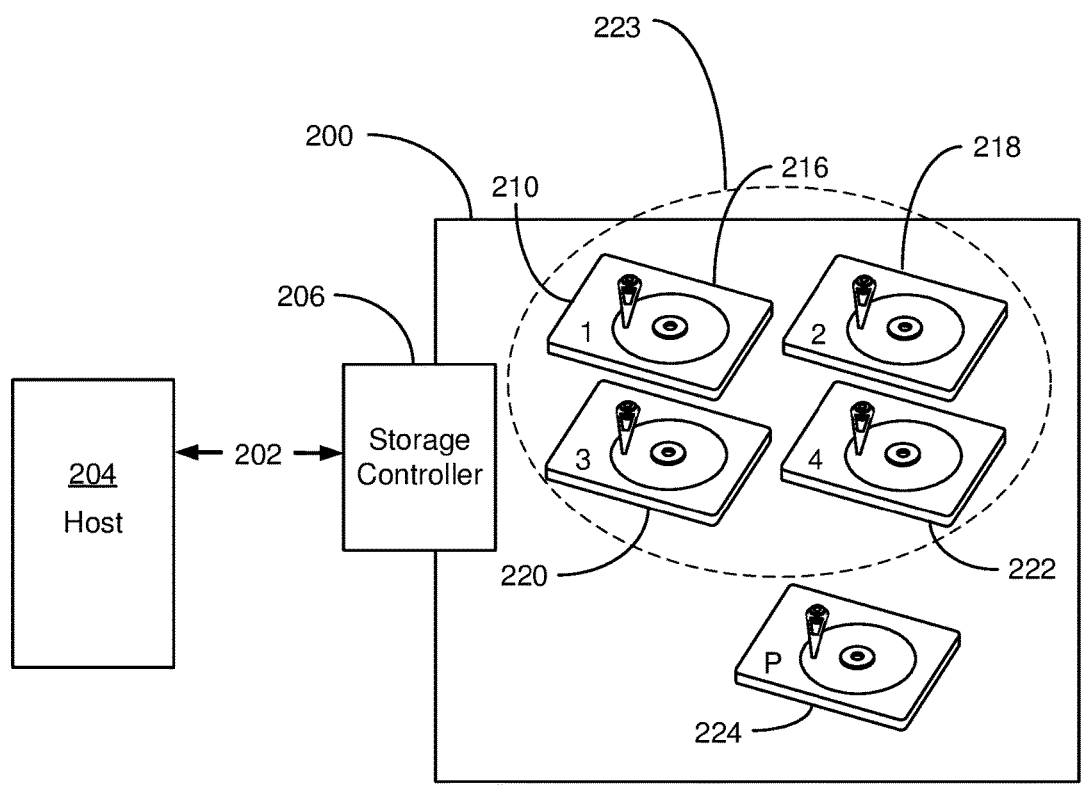
FIG. 2 depicts an embodiment of a data storage arrangement constructed in accordance with various embodiments of the present invention.

In an exemplary environment in which preferred embodiments of the present invention can be practiced, FIG. 2 depicts an embodiment of a data storage arrangement 200 constructed in accordance with various embodiments of the present invention. The storage arrangement 200 can generally comprise a plurality of SMR HDD's 210, a storage controller 206 shown in communication 202 with a host computer 204. Though not shown in the present embodiment, the storage system 200 can comprise a variety of additional components such as bus system, volatile memory, graphical user interface (GUI), central processing unit (CPU), fans, etc. within the scope and spirit of the present invention.

Figure 3A:
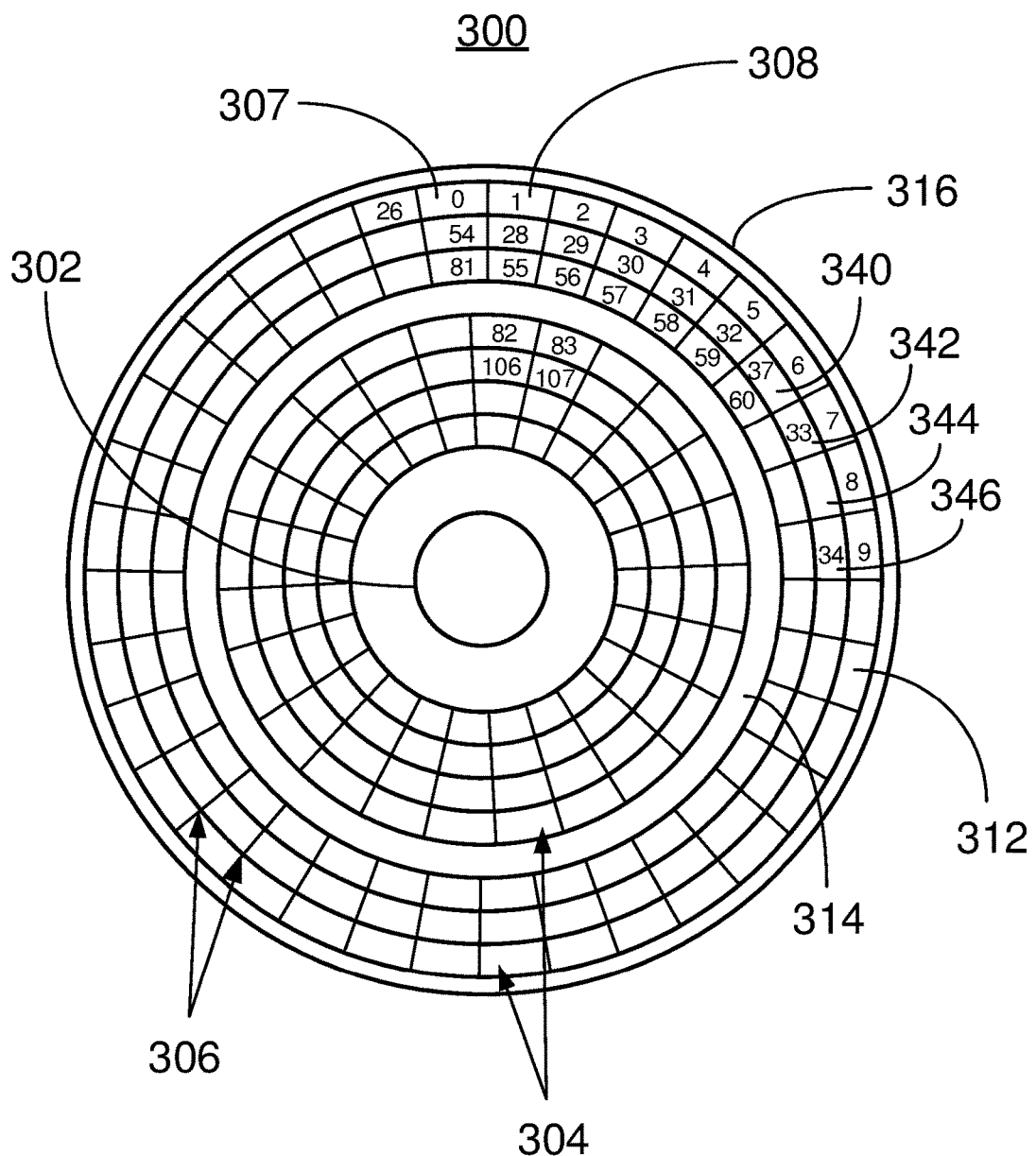
FIG. 3A illustratively depicts one embodiment of a conventional approach to logically arranging/mapping data on an SMR magnetic hard disk consistent with embodiments of the present invention.

FIG. 3A illustratively depicts one embodiment of an approach for logically arranging/mapping data on an SMR magnetic hard disk 300 consistent with embodiments of the present invention. As depicted, the SMR magnetic hard disk 300 is arranged with data tracks 312 constructed in concentric circles placed between the outer diameter of the disk 316 and the disk spindle hole 302. The disk spindle hole 302 is an opening that mates to a disk drive spindle (not shown). In this simplified arrangement, the disk 300 is formatted with two zones (or SMR bands) 304 that separate the SMR tracks 312 (which are very thick here for purposes of illustration) by way of a non-overlapping guard region 314. The tracks 312 are segmented in sectors 306 spaced apart to accommodate spin speed fluctuations. The sectors 306 of a track 312 are accessed consecutively as the disk rotates with respect to a read/write head (not shown). One sector of each track, e.g., sector-0 of track-1 307, is designated as being logically the first sector of the track, with subsequent sectors, e.g., sector-1 of track-1 308, being logically the next. FIG. 3A depicts a conventional approach to mapping logical block addresses (LBAs) to physical sectors, which is accomplished by mapping the lowest LBA "0" to the first sector-0 307 on the outermost track and follows a sector progression, e.g., LBA "1", sector-1308, etc. LBAs do not necessarily correspond to each successive sector 306, rather LBAs can be addressed to random sectors 306. For example, sector-33 is substituted with LBA "37" 340, sector-34 is substituted with LBA "33" 342, sector-35 344 has no LBA 344 and sector-36 is substituted with LBA "34" 346. In some cases a map of the LBAs are maintained (in software) by the disk drive.

Figure 3B:
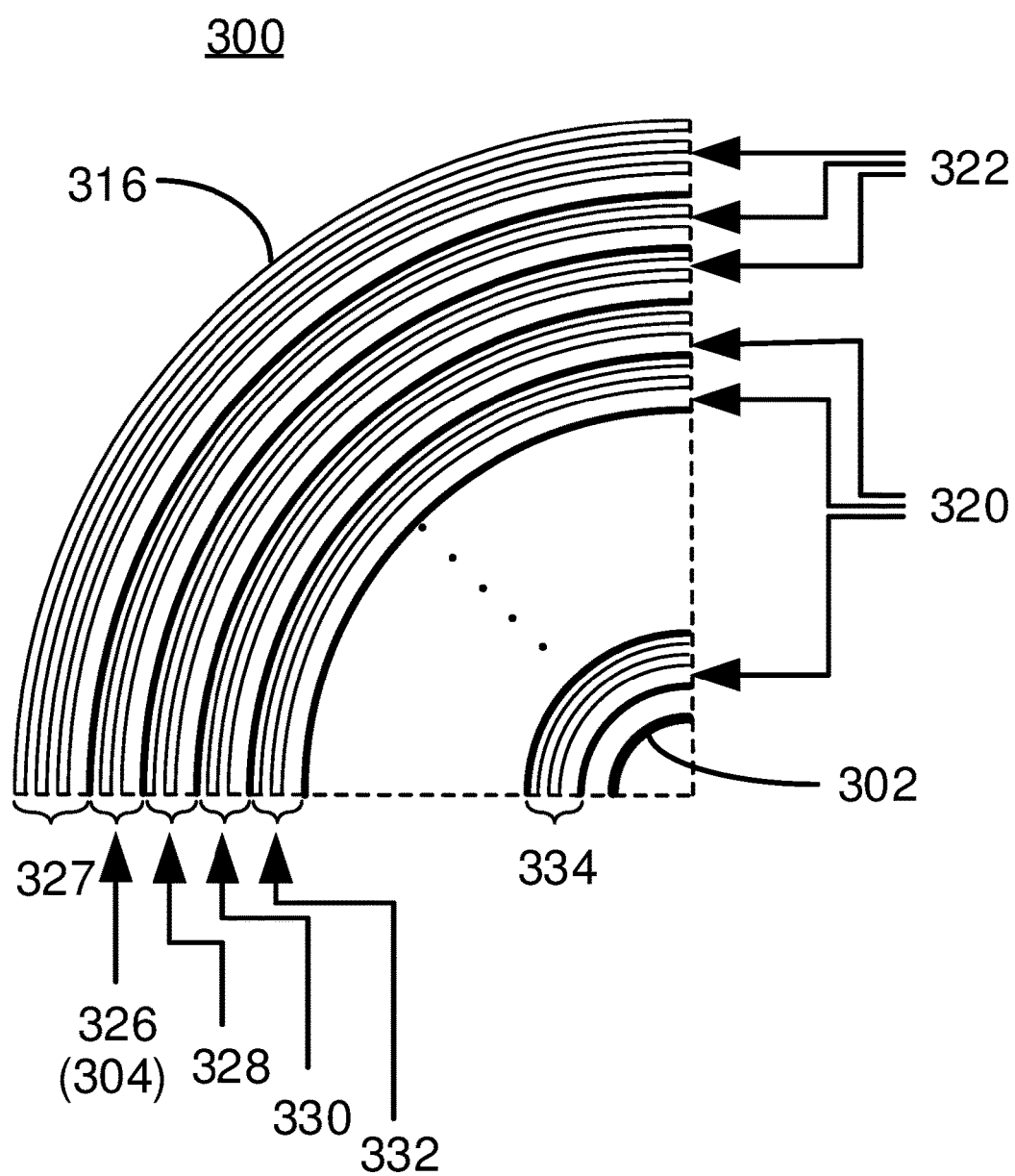
FIG. 3B illustratively depicts a quadrant of the magnetic hard disk 350 consistent with embodiments of the present invention.

FIG. 3B illustratively depicts a quadrant of the magnetic hard disk 350 consistent with embodiments of the present invention. In the SMR layout of the present example, the shingled data tracks 322 are separated by guard regions 320 forming SMR bands. The present example depicts the outer most diameter tracks 322 comprised of a persistent cache 327 used for staging random writes, which is intended for intermediate-term storage documents or data objects. The persistent cache 327 is a conventional non-shingled data format that allows for random access in both read and write. From the outer diameter 316 to the inner diameter 302 of the magnetic disk 350 are SMR Band-1 326, SMR Band-2 328, SMR Band-3 330, SMR Band-4 332 . . . SMR Band-N 334. The spindle location 302 is shown for reference.

Because SMR data is generated by partially overwriting a previous track, new data cannot be rewritten in a previously written SMR band 304. Rather, a previously written SMR band 304 must be rewritten in a completely new SMR band 304 to incorporate either 1) new data or 2) changed data. The previously written SMR band 304 is taken out of commission until a point in time where new data is directed to occupy the previously written SMR band 304.

Figure 4A:
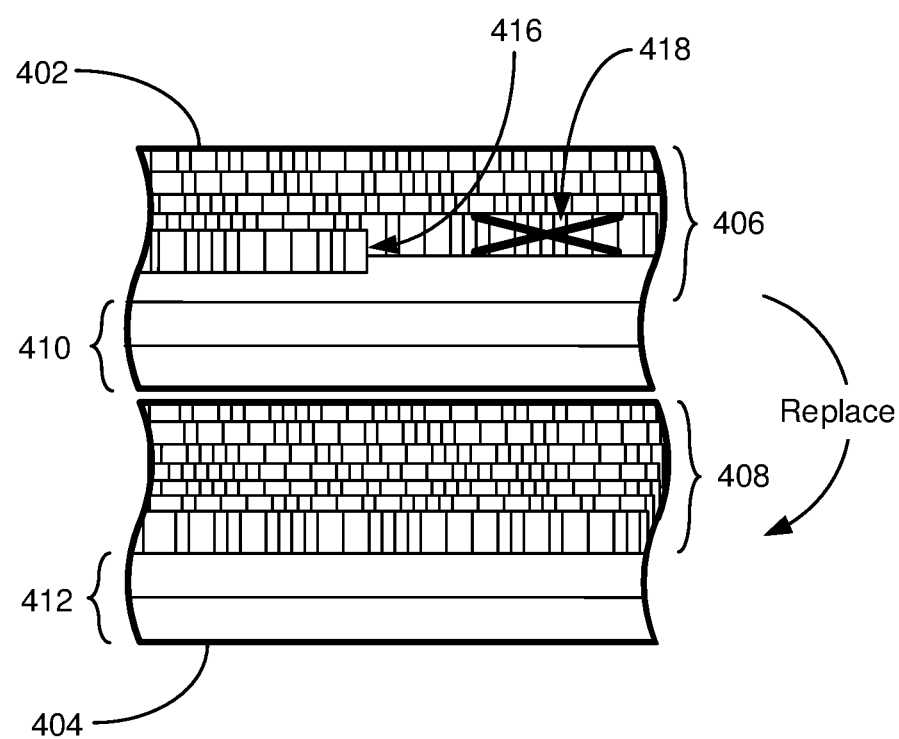
FIGS. 4A and 4B illustratively depicts sections of a couple of SMR bands consistent with embodiments of the present invention illustrating this process.

FIG. 4A illustratively depicts sections of a couple of SMR bands consistent with embodiments of the present invention illustrating this process. As exemplified, a first SMR band 402 possesses partially written data 406 whereby the data stream is terminated 416 due to an error in the data depicted by the "X" 418. A data stream is generally a large segment of data, such as a data chunk, data packet, data file, collection of files, and the like, that is received over a discrete period of time. In other words, the first data bit is transmitted and received before the last data bit. Certain embodiments envision a small data packet within the scope and spirit of the present invention. The "X" 418 can also be data intended to be changed within the SMR band 402. Assuming that the error in the data 418 must be fixed, or changed, a new SMR band 404 is generated with the data from the first SMR band 402 that includes the correction. The first SMR band 402 is decommissioned or signed as available for writing data as a new empty SMR band. For reference, a first guard band 410 is included with the first SMR band 402 and the second guard band 412 is included with the new SMR band 404. Here, the guard bands 410 and 412 are a couple of track widths wide, but can be one or many track widths wide. Any overlapping sectors 312 must be rewritten to avoid corruption of an adjacent sector 312.

Figure 4B:
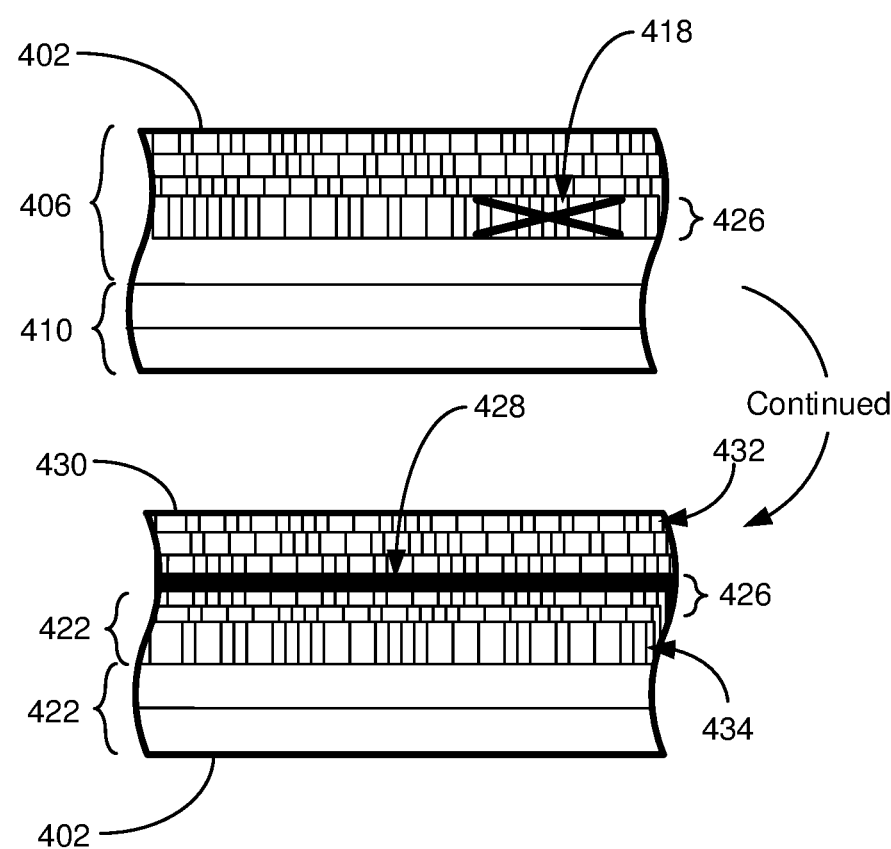

FIG. 4B depicts a visual illustration of an SMR band 420 deallocating a track or portion of a track consistent with embodiments the present invention. As discussed in conjunction with FIG. 3A, any specific data track may have a plurality of LBAs. Using the same SMR band 402 example of FIG. 4A, the data depicted by the "X" 418 that is not desired, either because of an error or simply a data change, for example, is dealt with by either decommissioning the entire track 426 or an LBA or LBAs that encompasses the "X" 418. As shown, by the curved arrow marked "Continued", following the determination that there is undesirable data 418 in track 426, the entire track 426 is "crossed out" (X'ed out) 428 as depicted by the solid black. All additional data tracks 424 consuming the rest of the space in the SMR band 402 are written successively following the "crossed out" track 426. Certain embodiments contemplate grouping one or more LBAs together to form a data block. Certain embodiments are envisioned to take advantage of efficiently decommissioning a data block/s possessing undesirable data 418 instead of the entire track. In the completed SMR band 430 (the bottom band), data is not written to the SMR band 402 without rewriting the entire SMR band 402 from the first track 432 to the last track 434 in the SMR band 402. Certain embodiments contemplate writing data to a partial SMR band, but all data downstream from the track that is rewritten must also be rewritten. For example, if track 426 is rewritten, obviously the rest of the tracks all the way down to the last track 434 must also be rewritten.

Returning to FIG. 2, for purposes of simplicity, shown therein are SMR drive-1 216, SMR drive-2 218, SMR drive-3 220, SMR drive-4 222, referred to herein collectively as the SMR drive group 223. A drive set includes SMR parity drive-P 224. Certain embodiments contemplate far more drives 210 than shown in FIG. 2, and drive sets can include more or less drives than SMR drive-1 216 through SMR drive-P 224.

Figure 5:
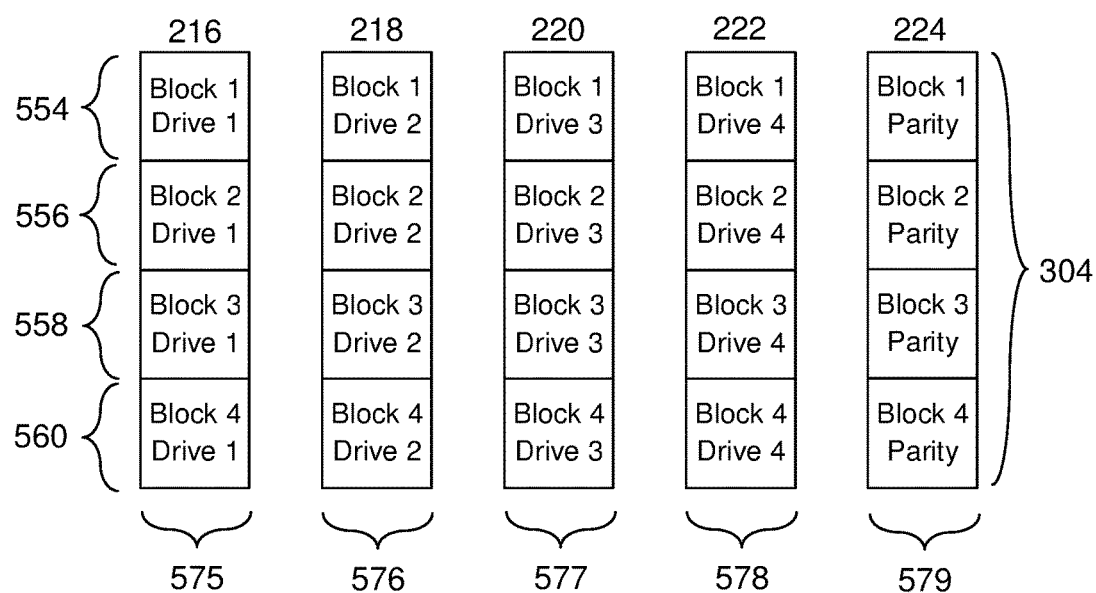
FIG. 5 depicts a block diagram of data layout on each of the SMR disk drives depicted in FIG. 2 consistent with embodiments of the present invention.

FIG. 5 depicts a block diagram of data stripes on each of the SMR disk drives depicted in FIG. 2 consistent with embodiments of the present invention. As shown in this embodiment, each of the SMR HDDs 216, 218, 220, 222, and 224 in the drive set possess four data blocks contained in one SMR data band 304. Hence, SMR band 575 for SMR HDD 216 comprises Blocks 1, 2, 3 and 4, SMR band 576 for SMR HDD 218 comprises Blocks 1, 2, 3 and 4, and so on. Other embodiments envision an SMR data band having fewer or more data blocks than shown in this exemplary embodiment, i.e., "n" data blocks. The four data blocks (Block 1, Block 2, Block 3, and Block 4) are arranged in order successively (1-4) for each SMR HDD. All of the data blocks from the SMR HDDs 216, 218, 220, 222, and 224 (in the drive set of SMR HDDs) that correspond in their specific position in the successive order define a data stripe. Generically, a data stripe is denoted as 554. For example, Block 1 across all of the SMR HDDs in the drive set defines stripe 1 554, Block 2 across all the SMR HDDs in the drive set defines stripe 2 556, Block 3 across all the SMR HDDs in the drive set defines stripe 3 558, and Block 4 across all the SMR HDDs in the drive set defines stripe 4 560. Hence, each successive data block from all of the plurality of SMR HDDs defines a data stripe. There are the same number of data stripes as there are data blocks in each SMR HDD. Certain embodiments contemplate that a data block consists of one or more whole LBAs, i.e., LBAs in integral form, not partial LBAs.

Figure 6A:
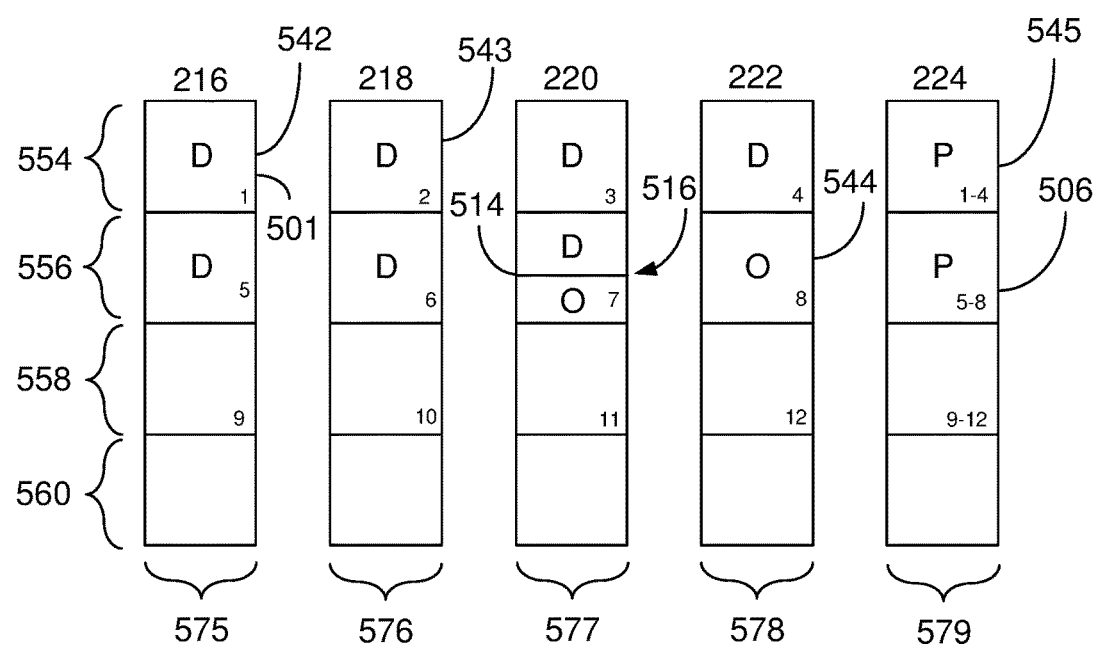
FIG. 6A depicts a block diagram of data layout on each of the SMR disk drives after receiving a transaction group sync depicted in FIG. 2 consistent with embodiments of the present invention.

FIG. 6A depicts data interruption from a transaction group sync in a set of SMR HDDs consistent with embodiments of the present invention. FIG. 6A depicts a block diagram of data stripes 554, 556, 558 across an SMR band in the SMR drive set of five SMR HDDs 216, 218, 220, 222 and 224. Each SMR band 575-579 can be divided into a plurality of data blocks, such as blocks 1-4 in SMR HDD 216 making up the SMR band 575. Each data block can be made up of one or more LBA. It is not required that each data block in a data band provide the same amount of data space. However, as previously mentioned, certain embodiments contemplate that each data block that comprises a data stripe (e.g., Block 1 across all SMR HDDs from the set defining Data Stripe 1 554) provides the same amount of data space. Assuming a data stream (or discrete segment of data, such as a data chunk, data packet, data file, collection of files, and the like) is received from a host system 204, the data stream is parceled into data sized chunks that are sized to fit into its destination data block. The act of parceling the data stream into chunks can be accomplished via a data buffer and controller system 206 that may, in certain embodiments, be internal to a data storage arrangement 200. In an example illustrating this, data Block 1 for each of the SMR HDDs may be sized to accommodate 16 GB of data (or some other block size of data), so accordingly the data stream is parceled into four 16 GB chunks. The four 16 GB chunks are then stored sequentially into Blocks 1 as $D_1$ 542 in SMR HDD 216, $D_2$ 543 in SMR HDD 218, $D_3$ in SMR HDD 220, and $D_4$ in SMR HDD 222. Parity data of $D_{1-4}$ is then stored in parity Block 1 545 (when the first data stripe 554 is fully allocated with the four 16 GB chunks). Data Block 2 for each of the SMR HDDs may be sized to accommodate 20 GB of data, so accordingly the data stream is then parceled into 20 GB chunks and stored successively to Blocks 2 as $D_5$ in SMR HDD 216, then $D_6$ in SMR HDD 218. The demarcation line at location 516 represents a point in the data stream where a transaction group sync is issued. The group transaction sync could be issued following completion of the data stream or optionally while the data stream is coming in to the data storage arrangement 200 (somewhere in the middle the data stream). The remainder of Block 2 514 is filled with 0's, or optionally some other fill bit/s, such as 1's for example. The last Block 2 544 in 2 556 is filled with fill bits, 0's in this example. Parity data of $D_{5-8}$ including the fill bits is stored in parity Block 2 506. Either a new data stream or the continuation of the original data stream commences storage to the third data stripe 558 starting with Block 3 from SMR HDD 216.

Figure 6B:
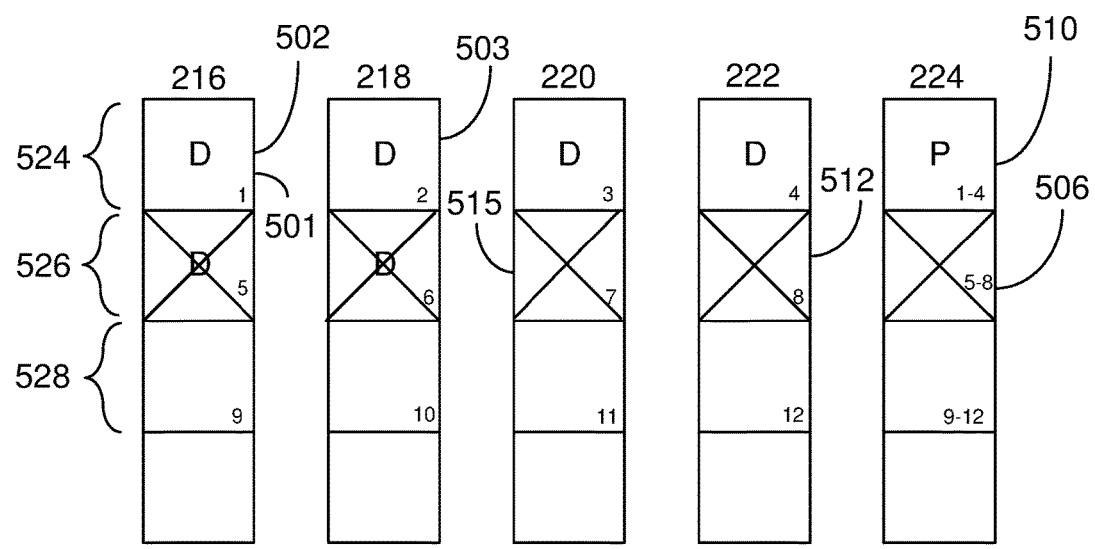
FIG. 6B depicts a block diagram of data layout on each of the SMR disk drives after interrupted data receipt consistent with embodiments of the present invention.

FIG. 6B depicts a block diagram of a data stripe decommissioned across the SMR disk drives depicted in FIG. 2 consistent with embodiments of the present invention. For example, each SMR drive in the SMR drive set possesses a plurality of data chunks 502. Each data chunk 502 can comprise one to a plurality of LBAs. Certain embodiments contemplate each data chunk 502 comprising whole integers of one to a plurality of LBAs, not one or more partial LBAs. As depicted here, each SMR drive in the SMR drive group 223 comprises a first stripe of data chunks 524 ($D_1$-$D_4$). More specifically, SMR drive-1 216 possesses a first chunk of data denoted by the number 1 in the bottom right corner of the first box 501 ($D_1$), SMR drive-2 218 possesses a second chunk of data denoted by the number 2 in the bottom right corner of the second box 503 ($D_2$), and so on for the data chunks in SMR drive-3 220 and SMR drive-4 222 ($D_3$, $D_4$). The parity drive 224 possesses parity data of each of the data chunks 1-4 in the first stripe of data chunks 524. In this particular embodiment, there is a transaction group sync, also known as a checkpoint, following writing the data chunk $D_4$ to the SMR drive-4 222. A transaction group sync can, for example, be when a user of data hits the "save" button to the data they are working on. Some host systems may issue periodic transaction group syncs while large sets of data are being streamed, for example. A second stripe of data chunks 526 depicts an example where a fifth and a sixth data block is written, $D_5$ and $D_6$, however there was an interruption in the data transfer after $D_6$ was written, such as power loss for example. In this situation, $D_5$ and $D_6$ are considered lost. Also, no data is written to data block 7 515 and block 8 512 and the parity block 506. In order to preserve order in the second stripe of data chunks 526 all of the data blocks that make up the data stripe are "X'ed out" (crossed out). In other words, the second stripe of data chunks 526 are taken out of commission including the LBA's for the parity drive in the second data stripe 526. After the data is "X'ed" out of the second stripe, storage of more user data can commence in the third data stripe 528, for example. Certain embodiments contemplate multiple data stripes being "X'ed" out because any user data subject to an interruption in the data transfer following the last transaction group sync will be decommissioned in increments of data stripes.

Figure 7:
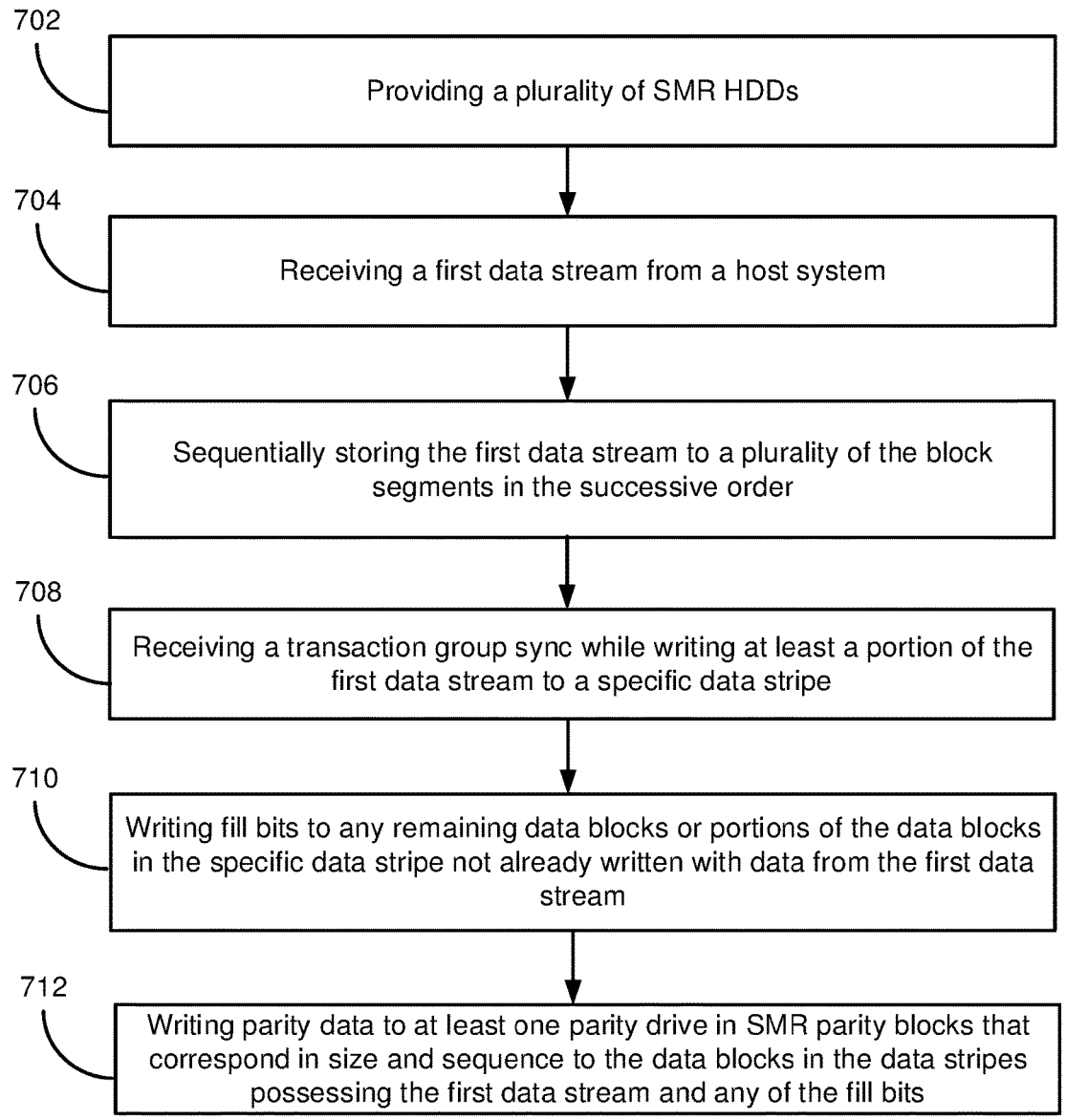
FIG. 7 is a block diagram of method steps consistent with embodiments of the present invention.

FIG. 7 depicts a flow chart of a method embodiment to manage a group of SMR HDDs including one or more parity SMR HDDs consistent with embodiments of the present invention. Step 702 presents providing a plurality of SMR HDDs 210, such as the drive set shown in FIG. 2 (SMR HDDs 216-224). Each of the SMR HDDs 210 comprise a plurality of SMR data bands 304 that comprise a plurality of data blocks, i.e., data blocks 1-$n$ that are successively ordered. By successively ordered, or ordered successively, it is meant 1, 2, 3, . . . n. Each of the SMR HDDs in the group 223 have a Block 1 through Block n (block segments). An example of this is depicted in FIG. 5 wherein SMR HDD 216 possesses Block 1, Block 2, Block 3, and Block 4 in SMR band 575, SMR HDD 218 possesses Block 1, Block 2, Block 3, and Block 4 in SMR band 576, and so on. Furthermore, each corresponding block in the SMR HDD group 223 defines a data stripe. For example, all of the Block 1s from the SMR HDD group 223 define the first stripe 554, all of the Block 2s defined the second stripe 556, and so on. In a single band, there are the same amount of SMR stripes across all of the SMR HDDs as there are SMR blocks in an SMR band in a single SMR HDD. Moreover, each SMR block is comprised of one or more whole (integer) LBAs.

Step 704 indicates that the first data stream is received by a host system 204. More specifically, in this embodiment and in view of FIG. 2, the data storage system 200 receives a first data stream via the storage controller 206. The first data stream is stored to a plurality of the block segments in successive order, step 706. For example, in view of FIGS. 5 and 6A, a first portion of the first data stream is stored to Block 1 of SMR HDD 216 until full, then a second portion of the first data stream is stored to Block 1 of SMR HDD 218 until full, then a third portion of the first data stream is stored to Block 1 of SMR HDD 220 until full, and so on. Certain embodiments contemplate the portions of the first data stream being divided up to meet the available storage capacity of each destination block, while other embodiments envision simply streaming into one data block at a time until the data block capacity is full and then moving onto the next data block. In the embodiment depicted in FIG. 6A, the first data stream fills data all of the data blocks for the first SMR stripe 554 ($D_{1-4}$) and the first two data Blocks 2 (SMR HDD 216 and 218) are filled with data from the first data stream ($D_{5-6}$), and a portion of Block 2 514 of SMR HDD 220 is filled, schematically shown by the demarcation line 516.

Step 708 is a step for receiving a transaction group sync (schematically shown by the demarcation line 516) while writing at least a portion of the first data stream to the second SMR data stripe. The transaction group sync is envisioned to be initiated by the host computer system 204, but could equally be initiated by the storage system 200 based on a policy to intermittently force a checkpoint. Certain embodiments envision the storage system 200 forcing a checkpoint at the completion of storing data to a data stripe, as an additional safety measure to protect user data from being lost. Other embodiments envision less than an SMR data stripe of user data being written before a transaction group sync, while other embodiments envision many SMR data stripes being written before a transaction group sync.

After the transaction group sync, no more user data is written to the specific SMR data stripe and any data space remaining in the SMR data stripe is padded with fill bits, step 710. For example, as depicted in FIG. 6A, the rest of Blocky is padded with fill bits and Blocks is also padded with fill bits. In the depicted embodiment the fill bits are 0's.

Step 712 is a step for writing parity data to at least one parity drive in the SMR parity blocks that correspond in size and sequence to the data blocks in the data stripe/s possessing the first data stream and any of the fill bits. For example, as depicted in FIG. 6A, only one parity SMR HDD 224 is present in the embodiment, which contains parity data ($P_{1-4}$) in parity Block 1 from Blocks 1 ($D_{1-4}$) and parity data ($P_{5-8}$) in parity Block 2 from Blocks 2 ($D_{1-4}$). Certain embodiments envision generating parity data for specific stripe as soon as data in the specific stripe is written, e.g., $P_{1-4}$ is generated as soon as $D_{1-4}$ is written. While other embodiments envision generating parity data at some other time.

Figure 8:
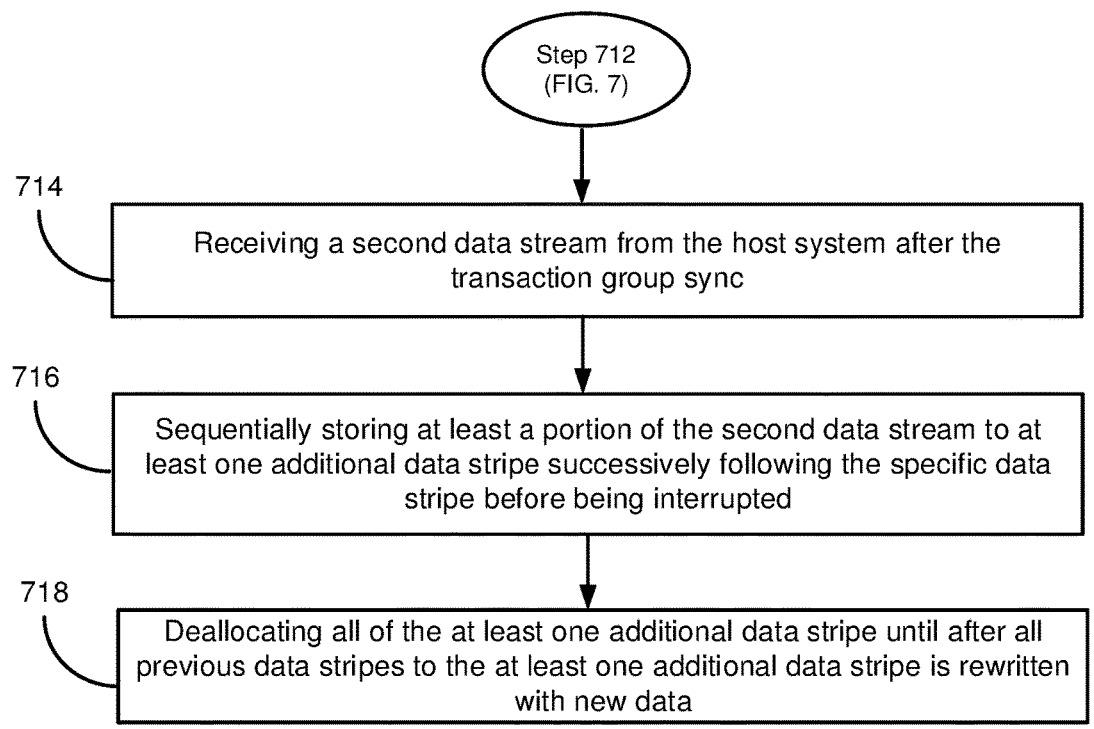
FIG. 8 is a block diagram of method steps consistent with embodiments of the present invention.

FIG. 8 depicts an optional embodiment of deallocating one or more SMR data stripes upon data interruption consistent with embodiments of the present invention. FIG. 8 can pick up from step 712, though could just as easily pick up from step 702. After the transaction group sync 516 a second data stream is received from the host system after the transaction group sync, step 714. It is contemplated that the second data stream can be either a continuation from the first data stream after the transaction group sync 516 or an entirely new data stream after the transaction group sync 516. Also, though step 714 indicates that the second data stream is received from the host computer system 204, it is envisioned that an entirely different host computer system is sending the second data stream.

Step 716 is a step for sequentially storing at least a portion of the second data stream to at least one additional SMR data stripe successively following the specific data stripe before being interrupted. For example, in view of FIG. 6B, assuming that a transaction group sync occurred following storage of the first SMR data stripe 524, data ($D_5$ and $D_6$) from the second data stream is stored to Block 2 of SMR HDDs 216 and 218 after which the second data stream is interrupted. Interrupted could be loss of power by either the host computer system 204 or the storage system 200, or could be some other mishap or error preventing storage of the rest of the second data stream.

From the point in time where the previous transaction group sync was made, all data stripes with at least a portion of the second data stream are deallocated including the parity block, step 718. Because of the shingled nature of the SMR data stripes (see FIGS. 4A and 4B), the deallocated data stripes are not rewritten until the entire SMR band 304 is rewritten. Certain embodiments contemplate the deallocated data stripes overwritten, but this must occur before any new data is written to the SMR band 304. Other embodiments contemplate that when the SMR data stripes are deallocated, they are not overwritten until the entire band is overwritten starting with the first SMR data stripe.

Figure 9:
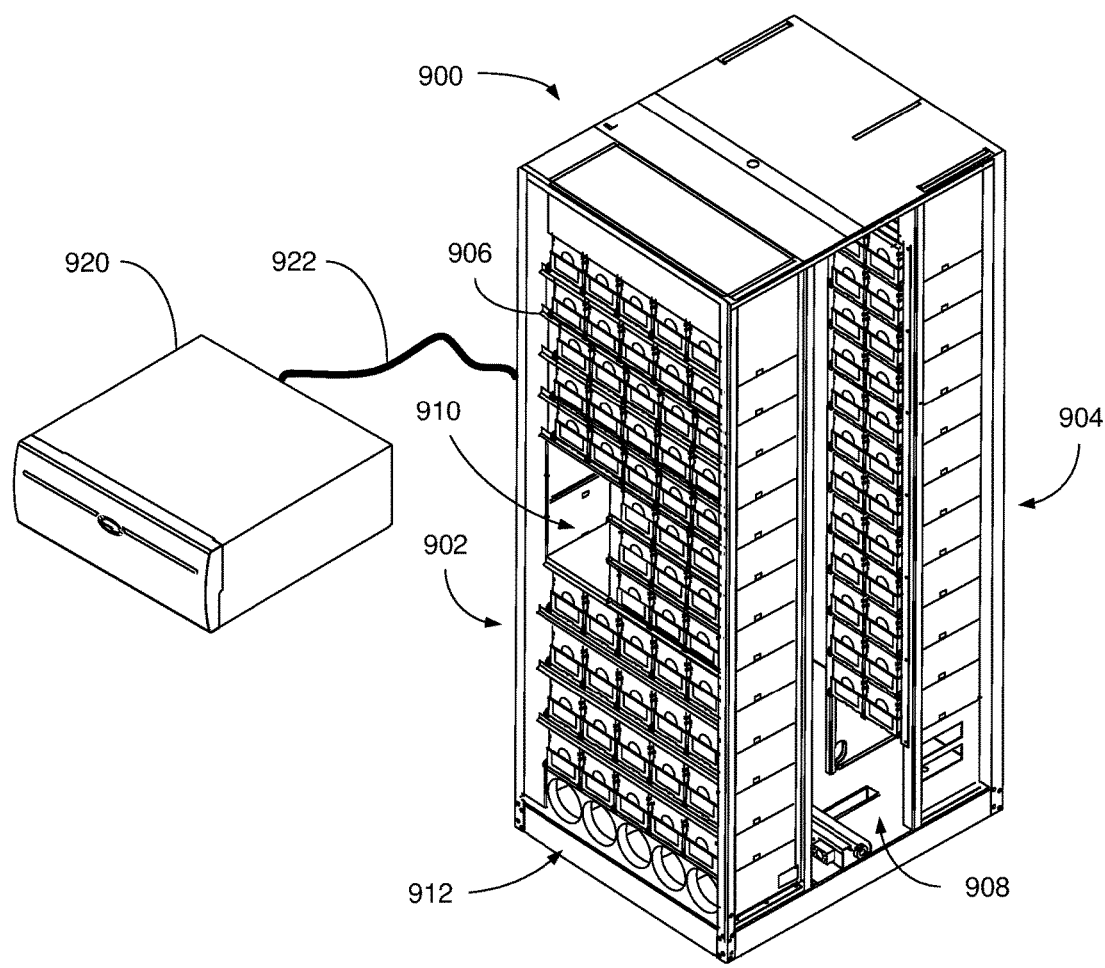
FIG. 9 is a schematic of an exemplary environment wherein embodiments of the present invention can be practiced.

Embodiments of the present invention can be commercially practiced in a Black Pearl archive storage system that possesses a Spectra Logic T-Finity tape cartridge library on the backend manufactured by Spectra Logic of Boulder Colo. FIG. 9 shows a commercial embodiment of one Black Pearl archive storage system 920 communicatively linked with the T-Finity unit 900 via a cable 922. The T-Finity unit 900 is shown without an enclosure, whereby the T-Finity unit 900 is a single cabinet whereby multiple cabinets can be combined to make an expandable library. The Black Pearl archive storage system 920 possesses archive storage controller (not shown) and a plurality of SMR hard disk drives (not shown) and software that facilitates receiving data from a server (not shown), caching that data in at least one of the plurality of hard disk drives, running LTFS software, providing a device driver (such as a SCSI to format data streams to tape format), encoder/decoder software, compression software, and the like in addition to control storing data to tape cartridges in the T-Finity library 900. The Black Pearl archive storage system 920 can complete the methods described herein including segmenting SMR HDDs and blocks and parceling incoming streams of user data to fill those blocks. The Black Pearl archive storage system 920 is capable of handling all storage commands including initiating transaction group syncs and receiving and executing transaction group syncs. SMR data held in the Black Pearl can be transferred in time for deeper storage to the T-Finity unit 900 comprises a first and second shelf system 902 and 904 that are adapted to support a plurality of the mobile media, such as tape cartridge magazines 906 comprising a plurality of LTO-6 tape cartridges, archived in the library 900. The second shelf system 904 comprises at least one tape drive (not shown) adapted to read and write data to and from a tape cartridge. Functionally interposed between the first and second shelf system 902 and 904 is a magazine transport space 908. The magazine transport space 908 is adapted to provide adequate space for a tape cartridge magazine 906 to be moved, via a magazine transport (not shown) and cartridge picker device (not shown), from a position in the first shelf system 902, for example, to/near a drive. Tape cartridge magazines 906 can be transferred into and out from the T-Finity library via an entry/exit port 910. Transferring tape cartridge magazines 906 in and out of the T-Finity library can be accomplished by an operator, for example. The T-Finity library comprises a means for cooling as shown by the fans 912, located at the base of the unit 900.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, more than 5 SMR HDDs can make up a set of SMR HDDs while still maintaining substantially the same functionality without departing from the scope and spirit of the present invention. Another example can include using these techniques with mixed kinds of random access memory devices, such as solid state drives, or other, or a combination of hard disk drives, solid state drives, and other kinds of random access memory devices while still maintaining substantially the same functionality without departing from the scope and spirit of the present invention. Further, for purposes of illustration, first and second tape HDD are used herein to simplify the description for a plurality of (many) HDDs. Also, the terms "one" is synonymous with "a", which may be a first of a plurality. Moreover, elements described herein as a first element (HDD for example) and second element is descriptive to mean a plurality of elements.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method comprising:
   providing a plurality of shingled media (SMR) hard disk drives (HDD), at least one of the SMR HDDs designated as a parity drive;
   each of the SMR HDDs possessing a first shingled band; each of the first shingled bands possessing an equivalent number of block segments, a first of the block segments in each of the first shingled bands defines a first block segment stripe, and each successive corresponding block segment in each of the first shingled bands defines a successive block segment stripe;
   receiving a first data segment from a host system;
   sequentially storing the first data segment successively to the first block segments except the at least one parity drive until receiving a transaction group sync from the host system;
   padding any remaining portion of the first block segment stripe except the at least one parity drive with padded digital data until the first block segment stripe is completely full of the first data segment and the padded digital data; and
   storing parity of the first data segment and the first padded digital data stored to the first block segment stripe to the first block of the at least one parity drive.

2. The method of claim 1 wherein the transaction group sync is received after completion of the first data segment.

3. The method of claim 1 wherein there is no remaining portion of the first block segment stripe to pad.

4. The method of claim 1 further comprising confirming the transaction group sync to the host system.

5. The method of claim 1 wherein the block segments in any specific block segment stripe are all of equal data capacity.

6. The method of claim 1 wherein the block segments in any specific block segment stripe all possess an identical number of logical block addresses, the logical block addresses are of integer value.

7. The method of claim 1 further comprising:
   receiving a second data segment from the host system after the transaction group sync;
   sequentially storing at least a portion of the second data segment to at least one additional block segment data stripe successively following the first block segment data stripe before being interrupted; and
   after being interrupted, filling the additional data block segment data stripe with fill data.

8. The method of claim 7 wherein the second data segment is a continuation of the first data segment stored after the transaction group sync.

9. The method of claim 8 wherein only a second block segment stripe is written to before being interrupted, the method further comprising:
   receiving a third data segment from the host system;
   sequentially storing the third data segment across a third block segment stripe in all of the SMR HDDs except the at least one parity drive; and
   storing parity of the third data segment stored to the third block segment stripe to a third block segment of the at least one parity drive.

10. The method of claim 9 wherein the third data segment is defined as data received after the second data segment is interrupted.

11. The method of claim 1 sequentially storing the first data segment successively to the first block segments except the at least one parity drive until receiving the transaction group sync from the host system, or until the first block segments that comprise a first block segment stripe is fully allocated.

12. The method of claim 1 wherein the plurality of SMR HDDs comprises a first Redundant Array of Independent Disks (RAID) group disposed in a storage cabinet that comprises other similar RAID groups.

13. A method comprising:
providing a plurality of shingled media recording (SMR) hard disk drives (HDD) each with a shingled data band, each of the shingled data bands possessing n data blocks that are successively ordered from a first data block to the n data blocks, each of the SMR HDDs possesses successively ordered data blocks that correspond in the order, each of the corresponding successively ordered data blocks from the plurality of SMR HDDs defines a data stripe, the n data blocks in each SMR HDD defines n stripes across the shingled data bands;
receiving a first data segment from a host system;
sequentially storing the first data segment to each of the data blocks of one of the stripes at a time successively;
receiving a first transaction group sync while writing at least a portion of the first data segment to a specific data stripe;
writing fill bits to any remaining data blocks or portions of the data blocks in the specific data stripe not already written with data from the first data segment; and
writing parity data to at least one parity drive in SMR parity blocks that correspond in size and sequence to the data blocks in the data stripes possessing the first data segment and any of the fill bits.

14. The method of claim 13 further comprising:
receiving a second data segment from the host system, or a different host computer system, after the transaction group sync;
sequentially storing at least a portion of the second data segment to at least one additional data stripe successively following the specific data stripe before the storing step is interrupted; and
deallocating all of the at least one additional data stripe until after all previous data stripes to the at least one additional data stripe is rewritten with new data.

15. The method of claim 13 wherein the second data segment is a continuation of the first data segment stored after the transaction group sync.

16. The method of claim 13 wherein the data blocks each are comprised of an integer number of logical block addresses.

17. The method of claim 13 wherein the data blocks in different stripes possess different data capacity.

18. The method of claim 13 wherein the data blocks in different stripes possess different numbers of logical block addresses.

19. A method comprising:
providing at least a first, a second, a third, and a parity shingled media recording (SMR) hard disk drive (HDD) each with a shingled data band, each of the shingled data bands possessing a specified number of data blocks arranged in order successively, all of the data blocks from the SMR HDDs that correspond to a specific position in the order define a data stripe, there is an identical number of the data stripes and the specified number of data blocks;
receiving a first data stream from a host system;
sequentially storing the first data stream to a plurality of the block segments in the successive order, one of the stripes at a time successively;
receiving a first transaction group sync while writing at least a portion of the first data stream to a specific data stripe;
writing fill bits to any remaining data blocks or portions of the data blocks in the specific data stripe not already written with data from the first data stream; and
writing parity data to at least one parity drive in SMR parity blocks that correspond in size and sequence to the data blocks in the data stripes possessing the first data stream and any of the fill bits.

* * * * *